US012798758B2

(12) United States Patent
De Plaen et al.

(10) Patent No.: US 12,798,758 B2
(45) Date of Patent: Nov. 17, 2026

(54) MOVABLE LEADING-EDGE FLAP WITH MULTIPLE FORCE FLOW PATHS

(71) Applicant: SONACA, Gosselies (BE)

(72) Inventors: Didier De Plaen, Woluwe-Saint-Pierre (BE); Michel Harre, Marcq-en-Baroeul (FR)

(73) Assignee: SONACA, Gosselies (BE)

( * ) Notice: Subject to any disclaimer, the term of this patent is extended or adjusted under 35 U.S.C. 154(b) by 251 days.

(21) Appl. No.: 18/727,930

(22) PCT Filed: Jan. 3, 2023

(86) PCT No.: PCT/EP2023/050056
§ 371 (c)(1),
(2) Date: Jul. 10, 2024

(87) PCT Pub. No.: WO2023/135037
PCT Pub. Date: Jul. 20, 2023

(65) Prior Publication Data

US 2026/0184418 A1 Jul. 2, 2026

(30) Foreign Application Priority Data

Jan. 11, 2022 (BE) .................................. 2022/5010

(51) Int. Cl.
*B64C 9/22* (2006.01)
*B64C 9/02* (2006.01)
(Continued)

(52) U.S. Cl.
CPC .................. *B64C 9/22* (2013.01); *B64C 9/02* (2013.01); *B64C 9/08* (2013.01); *B64C 13/34* (2013.01)

(58) Field of Classification Search
CPC .... B64C 9/08; B64C 9/16; B64C 9/22; B64C 13/34
See application file for complete search history.

(56) References Cited

U.S. PATENT DOCUMENTS 2,702,676 A * 2/1955 Delaney, Jr. .............. B64C 9/22 244/210
2,938,680 A * 5/1960 Greene ..................... B64C 9/22 244/210
(Continued)

FOREIGN PATENT DOCUMENTS

EP 0818387 A1 1/1998
GB 2213113 A * 8/1989 .............. B64C 9/22
WO 2010026410 A2 3/2010

OTHER PUBLICATIONS

Search Report for International Application No. PCT/EP2023/050056 dated Mar. 23, 2023.

*Primary Examiner* — Richard Green
(74) *Attorney, Agent, or Firm* — McDonald Hopkins LLC

(57) ABSTRACT

A movable leading-edge flap includes an aerodynamic part and at least one drive and guide rail system, which system includes two rails each extending over the entire length of the rail system, an intermediate reinforcement provided with a toothed drive track being housed between the two rails in a direction in which these three separate elements are stacked, rail-fastening elements allowing each rail to be fastened to the intermediate reinforcement, and each of the two rails having an overall C-shaped cross-section, with the two Cs arranged back-to-back and the recesses thereof open in the spanwise direction, the recesses defined by the overall C-shape of the rails being intended to receive elements for guiding the movable flap.

18 Claims, 8 Drawing Sheets

(51) Int. Cl.
*B64C 9/08* (2006.01)
*B64C 13/34* (2006.01)

(56) References Cited

U.S. PATENT DOCUMENTS

| | | | | |
|---|---|---|---|---|
| 4,471,928 | A | 9/1984 | Cole | |
| 9,016,636 | B2 * | 4/2015 | Parker | B64C 9/22 244/214 |
| 9,616,989 | B2 * | 4/2017 | Parker | B64C 9/02 |
| 10,737,763 | B2 * | 8/2020 | Schlipf | B64C 9/22 |
| 11,286,033 | B2 * | 3/2022 | Lorenz | B64C 9/22 |
| 11,608,156 | B2 * | 3/2023 | Mino | B64C 9/22 |
| 11,820,512 | B2 * | 11/2023 | Huber | B64C 9/22 |
| 2018/0281927 | A1 | 10/2018 | Schlipf et al. | |

* cited by examiner

MOVABLE LEADING-EDGE FLAP WITH MULTIPLE FORCE FLOW PATHS

CROSS-REFERENCE TO RELATED APPLICATIONS

This is the National Stage application of PCT international application PCT/EP2023/050056, filed on Jan. 3, 2023, which claims the priority of Belgium Patent Application No. 2022/5010, filed Jan. 11, 2022, both of which are incorporated herein by reference in their entireties.

TECHNICAL FIELD

The present invention relates to the field of aircraft wings, of the type comprising a fixed central wing body carrying one or more movable leading-edge flaps, also referred to as "Slats".

It is noted that the invention applies to all types of aircraft, such as a flying wing, an aeroplane with an engine in the tail of the fuselage, a supersonic aeroplane, etc.

PRIOR ART

On aircraft, each of the two wings of the airfoil is generally provided with high-lift movable flaps, mounted on the leading edge and on the trailing edge of the wing.

In a known manner, the flaps are deployed for the landing and take-off phases in order to increase the lift at low or medium speed. Moreover, during cruising at high speed, the movable flaps are retracted in order to limit the resistance to the forward movement of the aircraft. Again in a manner known to the person skilled in the art, the movement and the guidance of each flap is carried out using means housed in a fixed central wing body, as is known for example from the document EP 0 818 387. These means allow each movable leading-edge flap to be moved and guided according to a trajectory usually in the shape of an arc of a circle in relation to the fixed central wing body, between a retracted position in which the flap substantially conforms to the shape of the fixed body, and a deployed position in which this flap is moved forward and possibly downward.

More precisely, in order to allow the rotational guidance of the movable flap, it is generally provided with a plurality of drive and/or guide rails, in the shape of an arc of a circle corresponding to the trajectory of the flap during movement. The rails that fulfil a function of driving the flap are sized and provided in a number able to ensure, during flight, the transfer of forces from the flap to the fixed central wing body. They cooperate with rollers carried by this fixed central wing body, and also with movement means of the toothed wheel type.

Although this configuration is very widespread in aircraft wings, it can still be improved in several respects.

Firstly, in terms of safety and response to standards, which are ever more restrictive as regards the cases of fracture of aircraft parts. In the case of drive rails, fractures or start of fractures on these rails may not be detected in time, and may lead to a risk of detachment of the flap.

DISCLOSURE OF THE INVENTION

Therefore, the aim of the invention is to at least partially remedy the drawbacks mentioned above, relating to the embodiments of the prior art.

To this end, the object of the invention is firstly a movable leading-edge flap for aircraft comprising an aerodynamic part as well as at least one rail system for driving and guiding this movable flap, the flap also comprising means for mechanically connecting the aerodynamic part on a front end portion of the drive and guide rail system.

According to the invention, the drive and guide rail system includes two rails each extending over the entire length of the rail system, an intermediate reinforcement provided with a toothed drive track being housed between the two rails in a direction in which these three separate elements are stacked, the stacking direction preferably corresponding to the spanwise direction of the movable flap.

In addition, rail-fastening elements allow each rail to be fastened to the intermediate reinforcement, and, preferably, pass through each of the two rails as well as the intermediate reinforcement provided with the toothed drive track.

Furthermore, said means for mechanically connecting the aerodynamic part are fastened on a front end portion of each of the two rails.

Finally, each of the two rails has an overall C-shaped cross-section, with the two Cs arranged back-to-back and their recesses open in the spanwise direction, the recesses defined by the overall C-shape of the rails being for example intended to receive guide elements of the movable flap, even if other technical solutions may be considered, without departing from the scope of the invention.

Firstly, the invention provides a satisfactory response to the risks of fracture or start of fracture on the drive and guide rail system. Indeed, thanks to the duplication of rails within this system, if one of them is damaged, the other can ensure the take-up of forces between the aerodynamic part of the flap and the fixed central wing body. The two rails may thus be designed to each ensure, independently of one another, a take-up of forces at a given intensity and for a predetermined period, thereby significantly limiting the risks of loss of the flap in the event of damage, or even eradicating them entirely. In other terms, the rail system according to the invention has two separate force flow paths between the aerodynamic part of the flap and the toothed drive track, giving this system an increased degree of security and able to meet the most stringent standards in the field. The rail system thus has a so-called "Fail Safe" character, which permits the damage of one of the two rails without risking consequent damage such as the loss/the detachment of the flap.

Furthermore, the stack of two rails and of the toothed drive track give a compact character to this assembly, which is particularly advantageous in this usually very large environment. Again in terms of size, this is reduced in the direction of the thickness of the wing, when the guide elements are housed laterally in the open recesses, defined by the overall C-shaped rails.

In addition, the separation between the large toothed track and the two rails advantageously makes it possible to avoid weakening the mechanical strength of the latter, due to the absence of teeth on these rails.

Moreover, the invention provides at least any one of the following optional features, taken alone or in combination.

Preferably, each of the two rails is made in one piece, that is to say of a single piece, or also monobloc.

Preferably, the mechanical connection means comprise brackets fastened on the two rails.

Preferably, the rail-fastening elements comprise bolts distributed along the drive and guide rail system. Other types of fastening elements are nevertheless possible, without departing from the scope of the invention.

Preferably, on either side of a space defined between the two rails for housing the intermediate reinforcement provided with the toothed track, each of the two rails has portions for bearing on the other rail, in the stacking direction.

Preferably, the bearing portions are passed through by fastening elements.

Preferably, at least one guide element in the form of a lateral roller for guiding the movable flap, cooperating with an outer lateral edge of one of the branches of the Cs, is carried by a support in the form of a clevis comprising two clevis branches each having, at one free end thereof, a clevis branch extension that extends beyond the lateral roller in a direction opposite to that of a base of the clevis, the two clevis branch extensions being arranged on either side of the branch of the C with which the lateral roller cooperates. This enables the lateral roller, in the event of failure on one or more of the main rollers, to fulfil a safety function, known as "Fail Safe", by ensuring during at least one fixed period the height/vertical guide function normally ensured by the faulty main roller. In this case of failure, the aforementioned roller then fulfils the functions of lateral guidance and of vertical guidance of the flap.

Another object of the invention is an aircraft wing comprising a fixed central wing body, as well as at least one movable leading-edge flap as described above, intended to be moved relative to said fixed central body between a deployed position and a retracted position, the fixed central wing body being provided with means for actuating the toothed drive track of the movable flap, these actuation means preferably comprising a toothed drive wheel engaging with the toothed drive track of the movable flap.

Preferably, the wing includes reinforcing brackets arranged in a leading-edge portion of the fixed central body of the wing, and the actuation means are mounted on these reinforcing brackets.

Preferably, the fixed central body is provided with elements for guiding the movable flap, cooperating with the rails.

According to a first preferred embodiment of the invention, at least some of the guide elements of the movable flap, and preferably all of them, are housed in the recesses defined by the overall C-shape of the rails.

Preferably, in this first mode, the guide elements comprise main rollers cooperating internally with the two opposite branches of the Cs, and preferably also lateral rollers cooperating with the central core of these same Cs.

According to a second preferred embodiment of the invention, at least some of the guide elements of the movable flap cooperate with the rails by being arranged outside of the recesses defined by the overall C-shape of the rails.

Preferably, in this second mode, the guide elements comprise main rollers cooperating externally with the branches of the Cs, and preferably also lateral rollers also cooperating externally with the branches of the Cs.

The two preferred embodiments described above can be combined, without departing from the scope of the invention.

Finally, another object of the invention is an aircraft comprising at least one wing as described above, this same wing preferably being provided with a plurality of movable leading-edge flaps.

Other advantages and features of the invention will become apparent in the non-limiting detailed description below.

BRIEF DESCRIPTION OF THE DRAWINGS

This description will be given with reference to the appended drawings wherein.

DETAILED DISCLOSURE OF PREFERRED EMBODIMENTS

Figure 1:
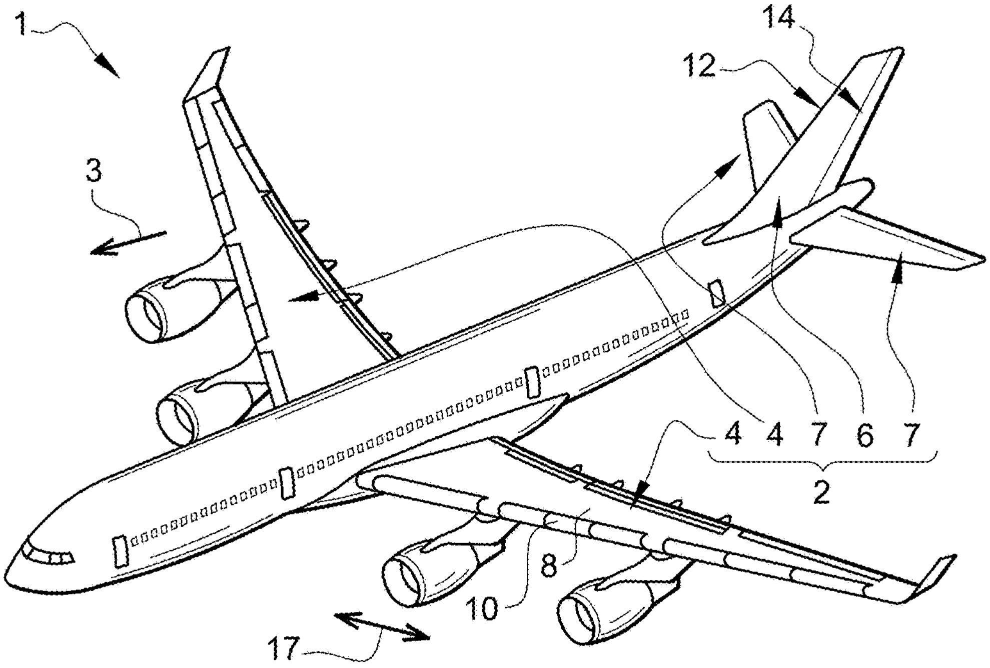
FIG. 1 represents a perspective view of an aircraft.

Firstly, with reference to FIG. 1, an aircraft 1 is represented having an airfoil 2 made of a plurality of airfoil elements, also called load-bearing aerodynamic surfaces.

Throughout the following description, the terms "front" and "rear" are to be considered in relation to a direction of forward movement of the aircraft encountered after the thrust exerted by the engines of the aircraft, this direction being represented schematically by the arrow 3, and also referred to as "flight direction".

Among the airfoil elements of the aircraft 1, two main wings, known as wings 4, a vertical stabiliser 6, as well as two horizontal tails 7 located at the rear of this aircraft are provided.

As regards the wings 4, as mentioned above, these each comprise a fixed central wing body 8, also referred to as main central portion, this body forming almost the entire wing, and being located at the rear of a leading edge 10.

Figure 2:
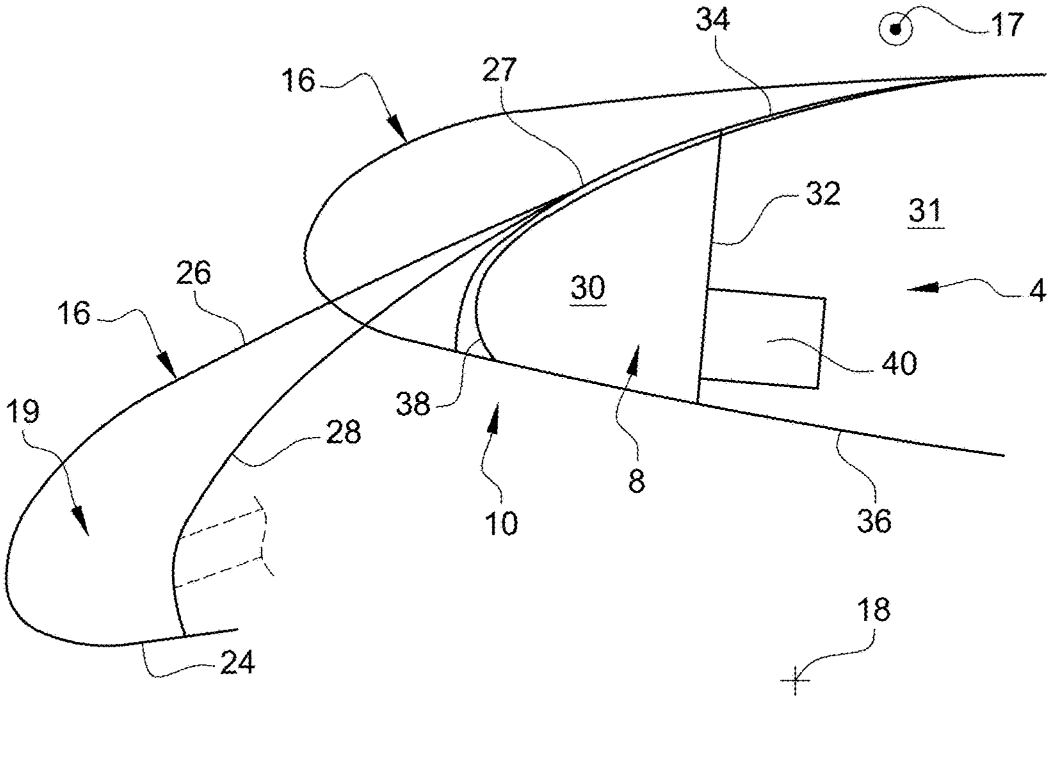
FIG. 2 represents a schematic and partial sectional view of an aircraft wing according to the present invention, provided with a movable leading-edge flap shown in two separate positions.

As schematically shown in FIG. 2, the leading edge 10 of each of the two wings 4 may be provided with at least one movable leading-edge flap 16 specific to the present invention, and known as "Slat". Usually, a plurality of movable leading-edge flaps 16 follow on from one another along the fixed central body 8, according to a spanwise direction 17 of the wing.

Each of these flaps 16 is intended to be connected to the body 8 by means only represented partially in dotted lines at the bottom of FIG. 2, and which will be explained in detail below. This FIG. 2 shows that the movable leading-edge flap 16, of which its aerodynamic part 19 is represented for example in the form of a box, can occupy a retracted position in which it is flush with the front part of the fixed central body 8 of the wing 4. In such a case, the movable flap 16 is in its most rearward position. In addition, the movable flap 16 can occupy an entirely deployed position, represented further to the left in the Figure, where it is at a distance towards the front of the fixed central body 8, this entirely deployed position being adopted in particular during take-off and landing phases in order to increase the lift at low or medium speed. This flap 16 is of course designed to be moved between these two extreme positions, for example in such a way as to make it adopt an intermediate take-off position, known by the person skilled in the art.

By way of indication, the movable flap 16 extends for example substantially over the entire length of the wing 4 concerned, of course in the spanwise direction 17 of this wing 4, or only over a portion of this wing, as this is most common on aircraft, where each wing is provided with a plurality of movable flaps 16 as indicated above.

In a known manner, the aerodynamic part 19 of the flap 16 includes an aerodynamic cover defining an intrados portion 24 as well as an extrados portion 26, the latter ending by a trailing edge 27 of the flap. In addition, this part 19 is closed rearwards by a closure cover 28, intended to conform to the shape of the fixed wing body 8 when the flap 16 occupies the retracted position.

The fixed central wing body 8 has a front end space 30, located in front of a wing box 31 and preferably delimited rearwards by a front longeron 32 of this box. This space 30 forms a leading edge portion of the fixed body 8.

The front longeron extends parallel to the spanwise direction 17, substantially over the entire length of the wing. Thus, it forms the fixed wing box 31 with an extrados skin 34, an intrados skin 36, and a rear longeron that cannot be seen in FIG. 2. The wing box 31 conventionally provides a structural function to the wing, but it may also be at least partially filled with fuel. At the front of this box 31, the fixed central body 8 includes a wall 38 forming a leading edge of this body 8, of shape complementary or substantially complementary to that of the rear closure cover 28 of the aerodynamic part of the flap 16.

In FIG. 2, the movable flap 16 is therefore represented in its two retracted and deployed positions. The movement between these positions is carried out by actuation means 40 (only represented schematically), housed in the fixed central body 8. As regards the trajectory of the flap following an arc of a circle, it is imposed by one or more drive and guide rail systems specific to the invention, possibly completed by one or more simple guide devices here for setting in rotation the flap 16 about an axis of rotation 18. More complex motions of the flap can nonetheless be considered, for example motions including such a rotation, without departing from the scope of the invention.

With reference to FIGS. 3 to 10, only one of the drive and guide rail systems according to a first preferred embodiment of the invention will be described, it being specified that a plurality of these systems may be provided with the same movable flap 16, preferably by being spaced apart from one another in the spanwise direction 17.

The flap 16 therefore includes, in addition to its aerodynamic part 19, a rail system 42 for driving and guiding this flap in relation to the fixed body 8. Globally, this rail system 42 is particular in that it includes two parallel rails 44, each extending over the entire length of the rail system 42. In addition, an intermediate reinforcement 46 parallel to these two rails 44 has a toothed drive track 48, and this reinforcement 46 is housed in a space 50 defined between the two rails 44. These three elements 44, 46, 44 are pressed against one another in a stacking direction here corresponding preferably to the spanwise direction 17, it being specified that these same three separate stacked elements each have the same overall curved shape following an arc of a circle centred along the axis 18, and being inscribed in a plane orthogonal to the spanwise direction 17.

Figure 3:
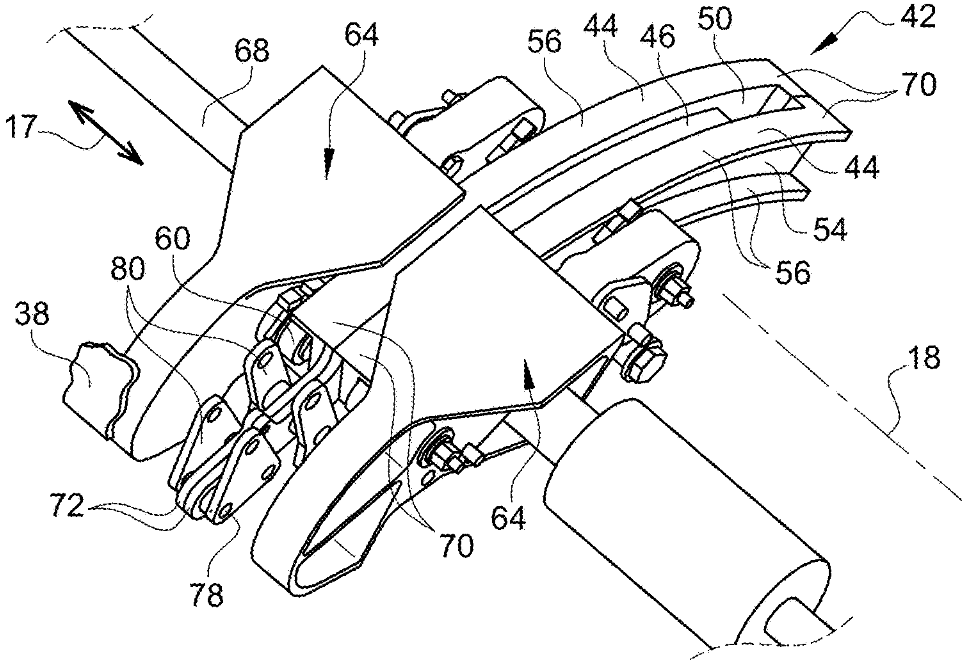
FIG. 3 represents a partial perspective view of a drive and guide rail system forming an integral part of the movable leading-edge flap shown in FIG. 2, and being in the form of a first preferred embodiment of the invention.

Each of these three elements 44, 46, 44 is made in one piece, preferably being made of metal or of composite material comprising a matrix and a filler, integrating for example glass fibres and/or carbon fibres. In order to perform their assembly, fastening elements 52 are provided that pass through each of the two rails 44 as well as the intermediate reinforcement 46, at a distance from its toothed drive track 48. Preferably, this concerns bolts 52, for example oriented parallel to the stacking direction, and spaced apart from one another along the rails 44, from the front to the rear. In FIG. 3, for example five bolts 52 are distributed along the rail system 42. Alternatively, the two rails 44 could be assembled separately on the intermediate reinforcement 46, that is to say with separate fastening elements therefore not shared by these two rails, for example of the rivet type.

A very large proportion of each of the two rails 44 has a part for guiding the flap, recognisable with its overall C-shaped section. The guide part preferably starts from the rear end of each rail 44, and extends up to close to a front end. It may concern for example a length in the order of 70% or more of the overall length of the rails 44, each made in a single piece.

The two C-shaped guide parts of the rails 44 are arranged back-to-back, the central core 54 of the two Cs facing each other. On the other hand, the two opposite branches 56 of the two Cs, respectively extending from the two ends of each central core 54, form two recesses 58 open in the spanwise direction 17, that is to say two recesses open laterally in directions opposite to that of the intermediate reinforcement 46.

Figure 6:
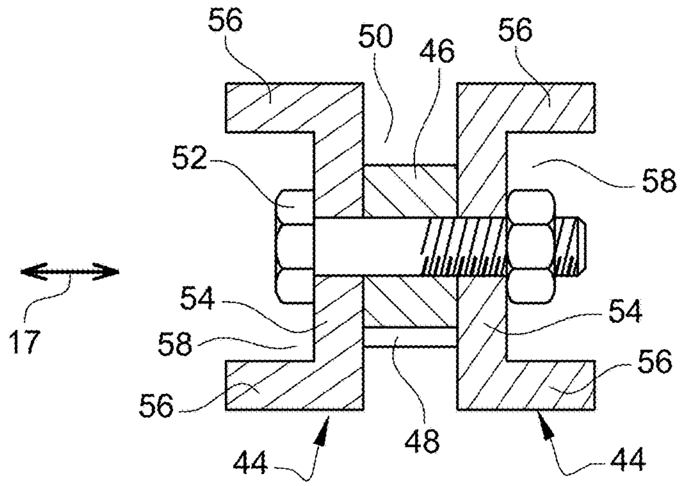
FIG. 6 is a transverse sectional view of the rail system shown in the preceding figure.
Figure 7:
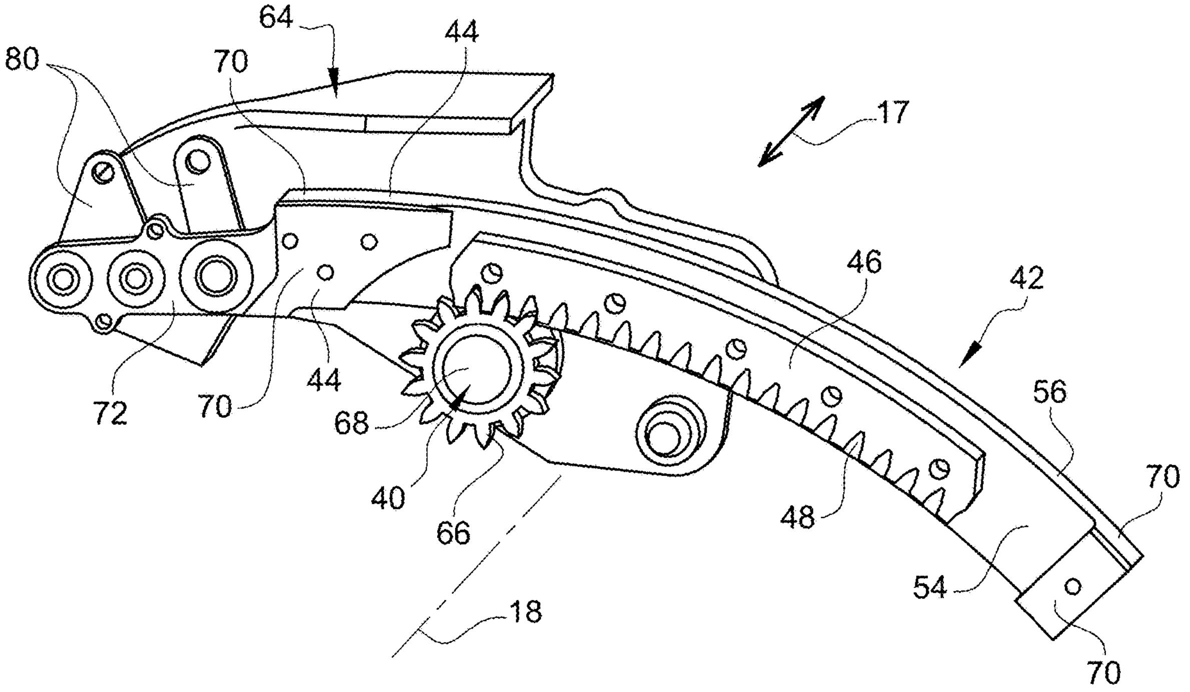
FIG. 7 represents a perspective view of the rail system in cooperation with actuation means integrated into the fixed wing body, the view being cut along a sectional plane orthogonal to the spanwise direction of the flap.
Figure 8:
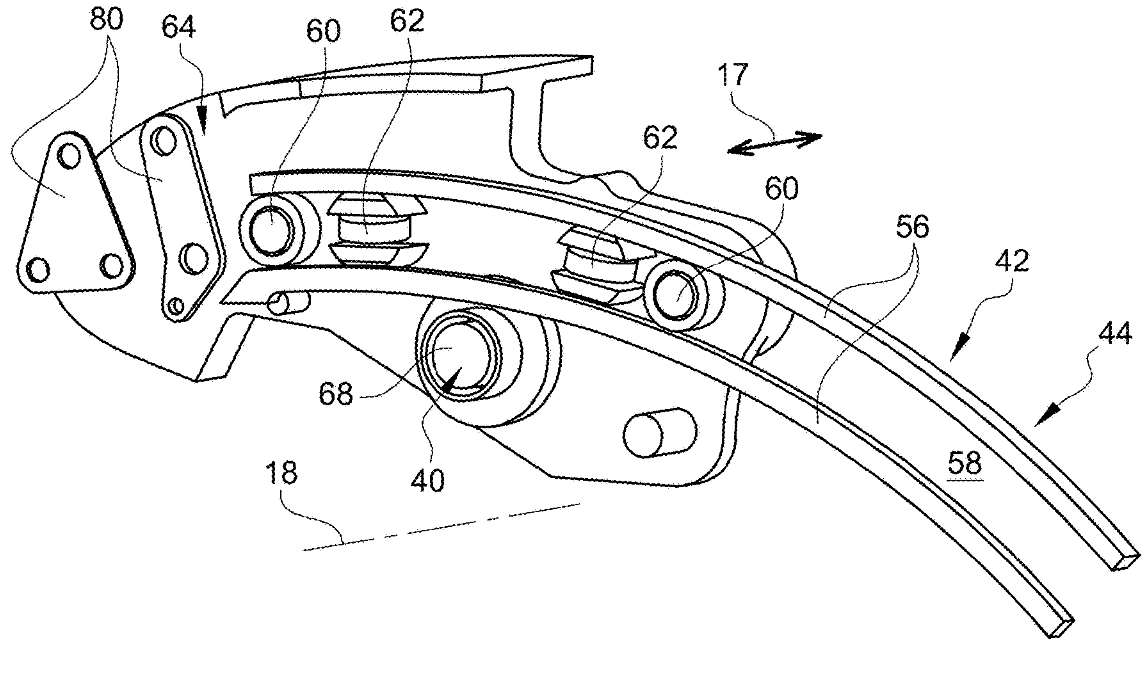
FIG. 8 represents a perspective view similar to that of FIG. 7, cut along another sectional plane orthogonal to the spanwise direction of the flap.
Figure 9:
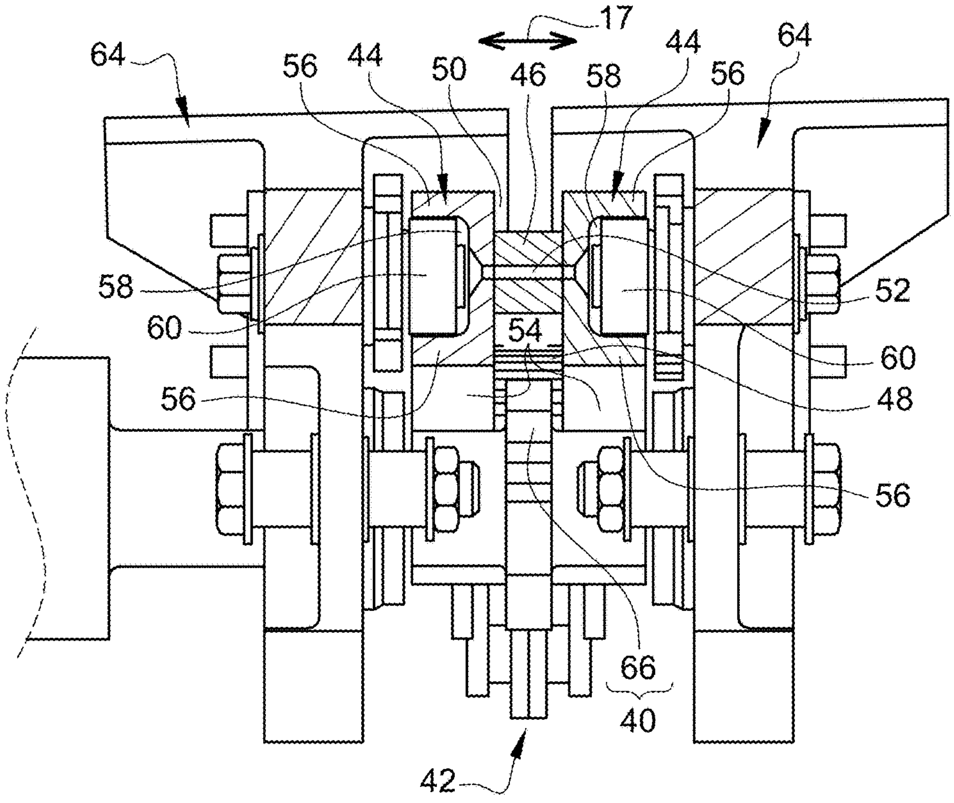
FIG. 9 represents a sectional view of the rail system in cooperation with actuation means integrated into the fixed wing body, the view being cut along a sectional plane parallel to the spanwise direction of the flap.
Figure 10:
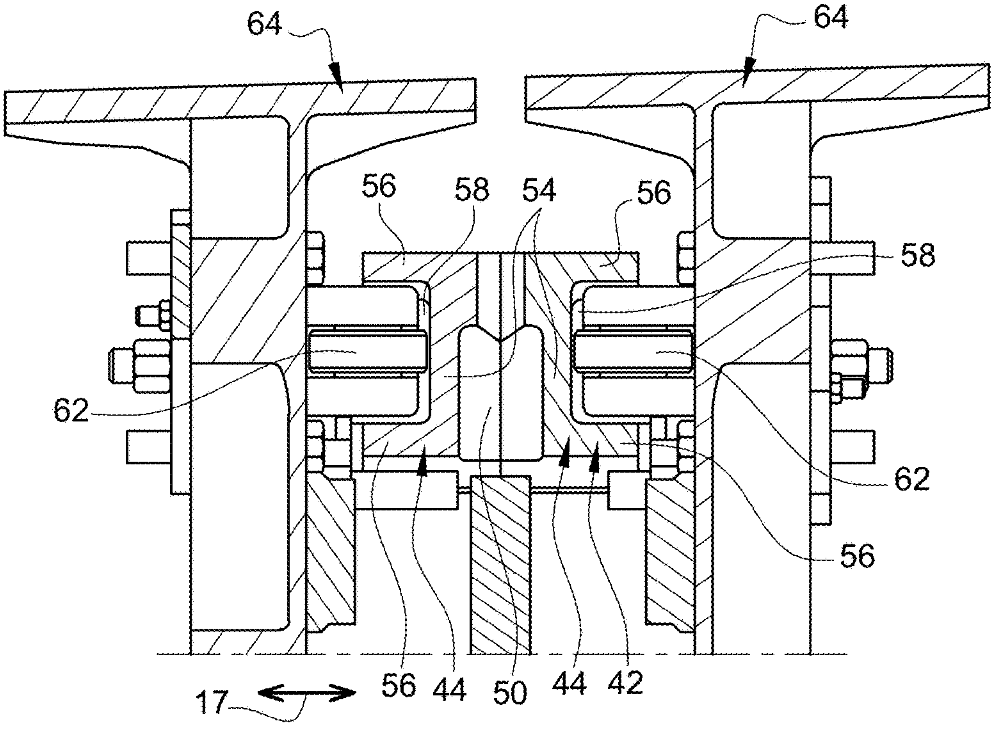
FIG. 10 represents a sectional view similar to that of the preceding one, cut along another sectional plane parallel to the spanwise direction of the flap.
Figure 11:
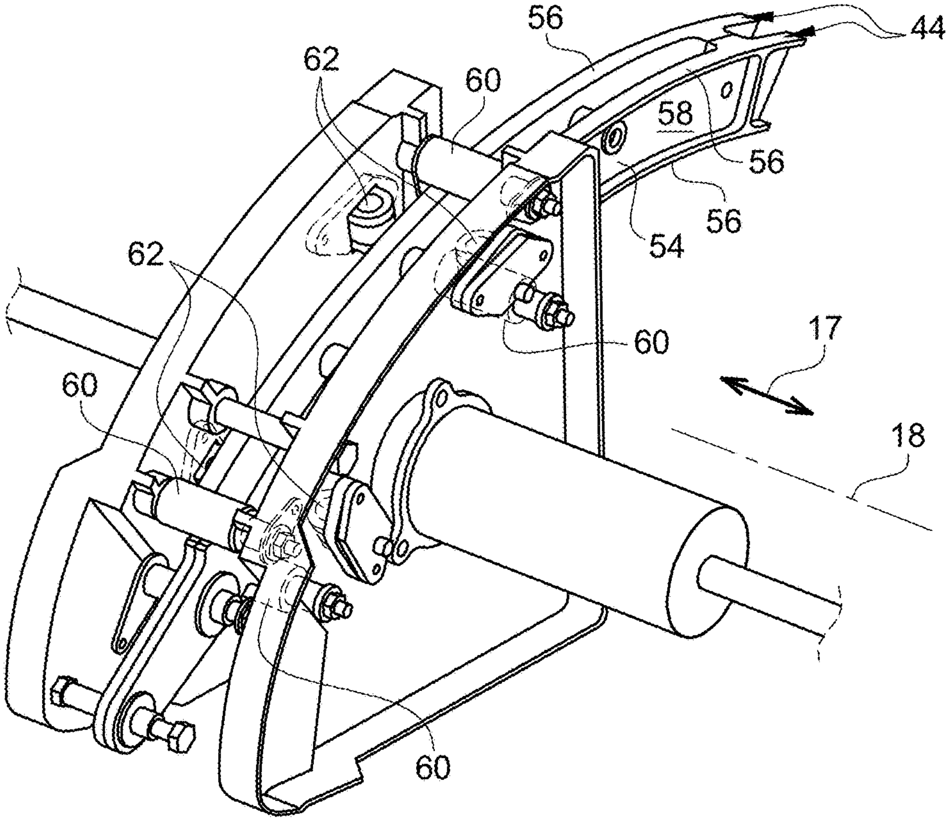
FIG. 11 represents a partial perspective view of a drive and guide rail system similar to that of FIG. 3, and being in the form of a second preferred embodiment of the invention.
Figure 12:
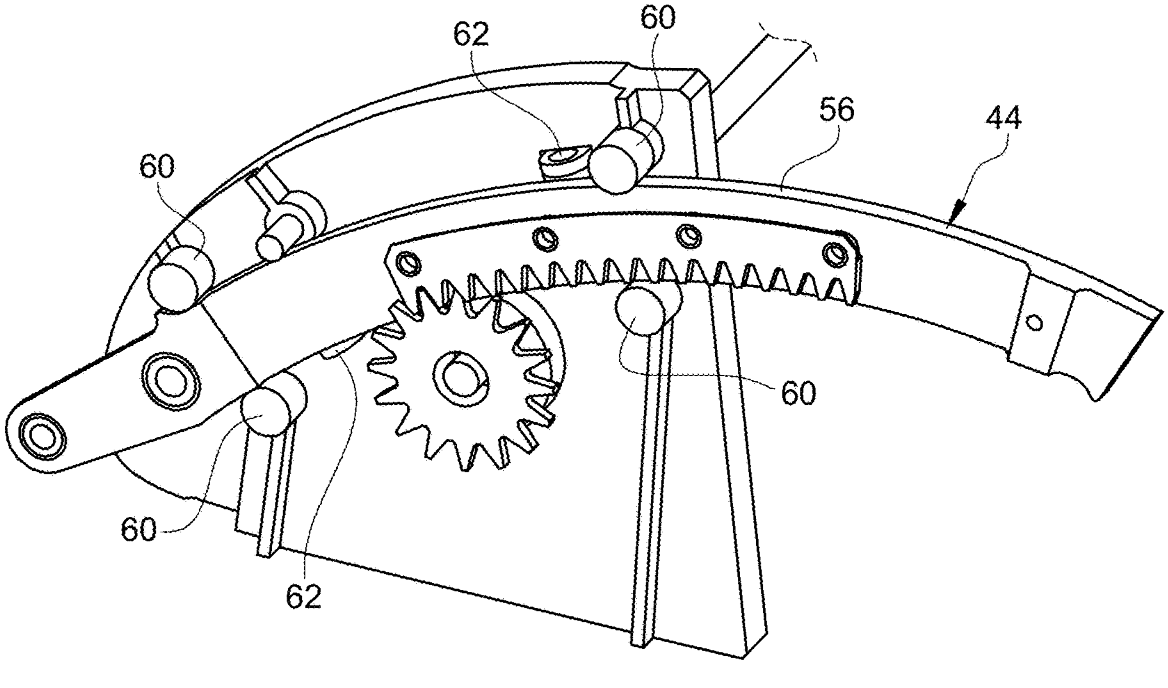
FIG. 12 represents a perspective view of the rail system in cooperation shown in the preceding figure, with actuation means integrated into the fixed wing body, the view being cut along a sectional plane orthogonal to the spanwise direction of the flap.
Figure 13:
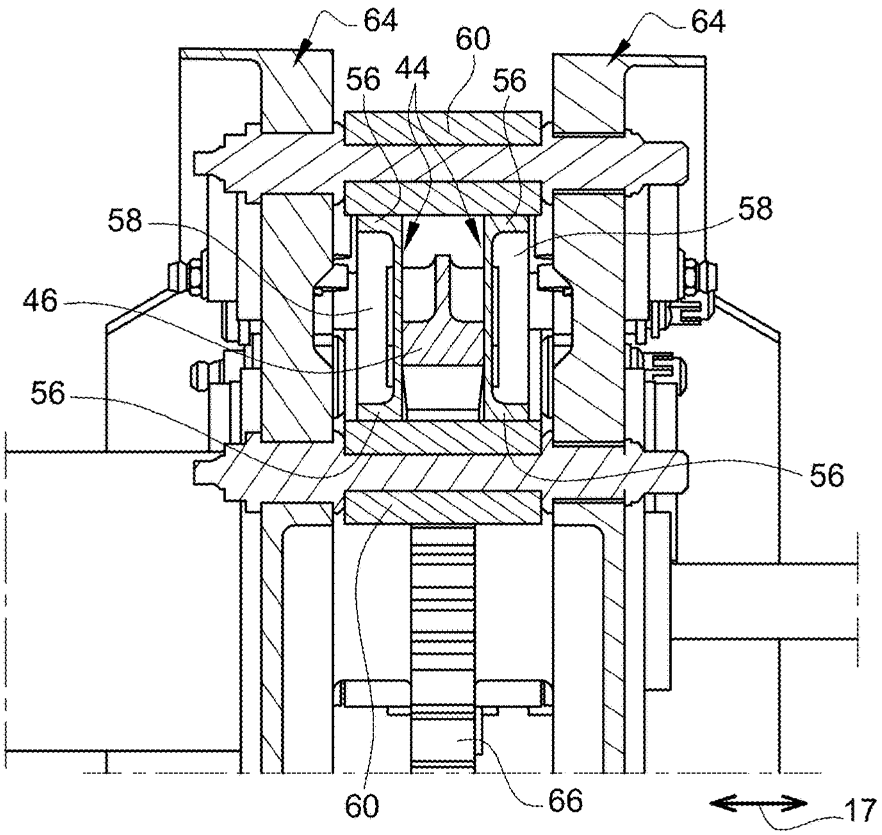
FIG. 13 represents a sectional view of the rail system shown in FIGS. 10 and 11 in cooperation with actuation means integrated into the fixed wing body, the view being cut along a sectional plane parallel to the spanwise direction of the flap.

The C shape that defines the recesses 58 is perfectly adapted to perform the guiding of the flap, using guide elements of the roller 60, 62 type, which are housed in these recesses 58. In FIG. 6, the opposite ends of the fastening elements 52 are represented protruding inside the recesses 58, but an alternative solution may consist in that these ends are not protruding, for example contained in the spot facing provided on the central cores 54 of the two Cs.

Figure 4:
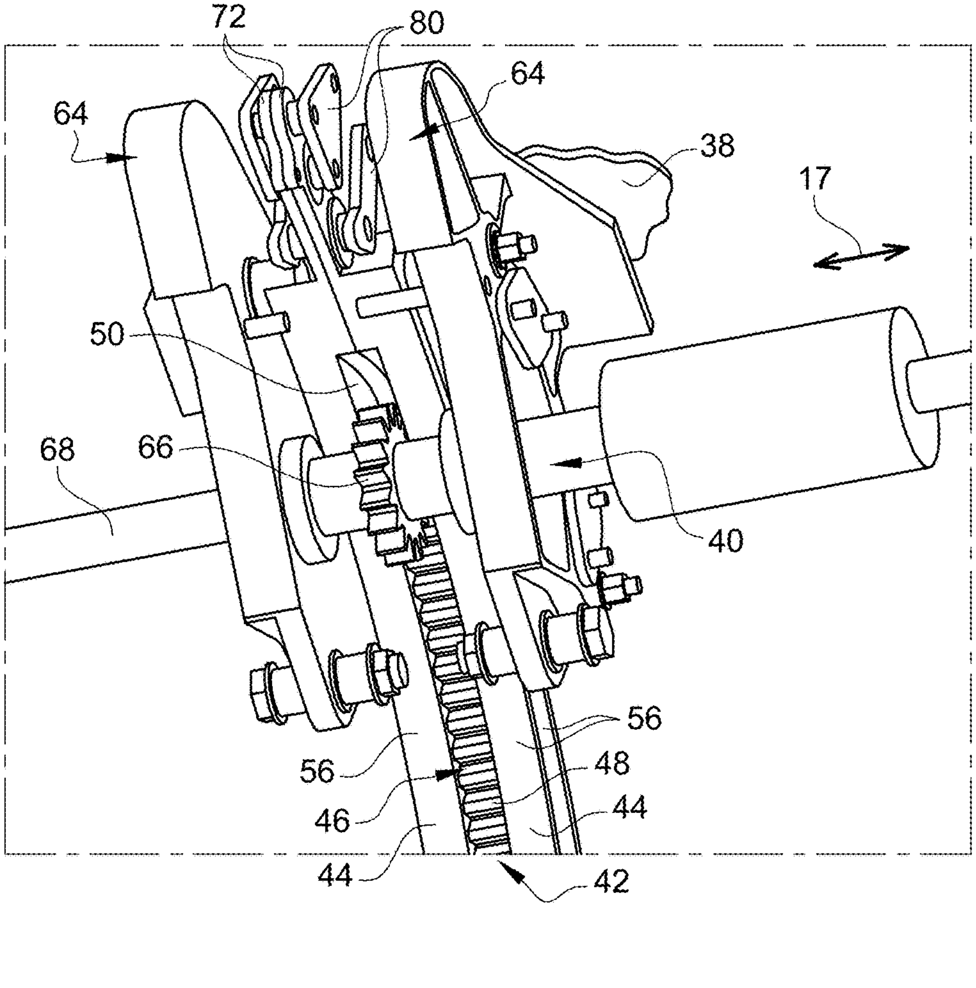
FIG. 4 represents a perspective view similar to the preceding one, according to another view angle.
Figure 5:
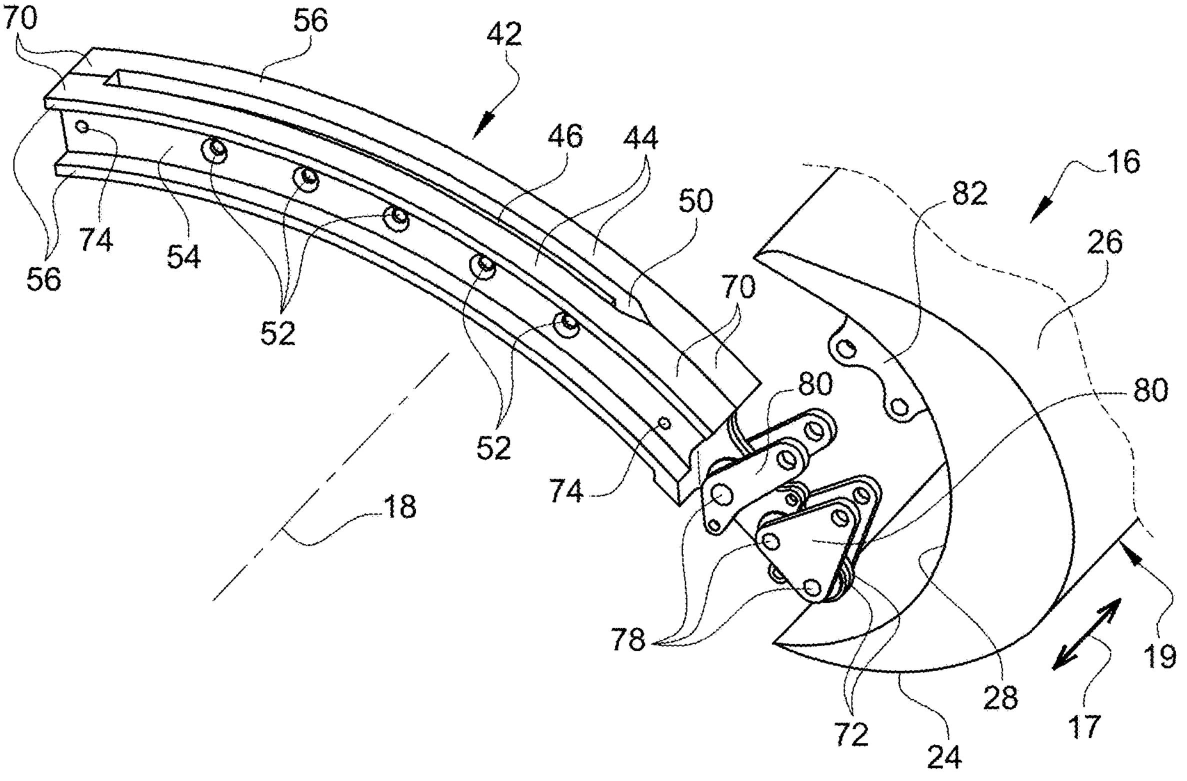
FIG. 5 represents a partially exploded perspective view of the drive and guide rail system shown in the preceding figures, in cooperation with the aerodynamic part of this movable flap.

In this regard, it is noted that the fixed central body 8 is provided with reinforcing brackets 64 that are arranged in the leading edge portion 30, and that are possibly themselves fastened to the front longeron of the fixed wing box. Each reinforcing bracket 64 extends globally in a plane orthogonal to the spanwise direction 17, by having a contour of shape complementary to that of the leading edge portion 30. In particular, the front end of each reinforcing bracket 64 is intended to conform internally to the shape of the wall 38 forming the leading-edge of the fixed wing body, as can be seen in FIGS. 3 and 4.

In the preferred embodiment represented, two reinforcing brackets 64 are respectively arranged on either side of the rail system 42, in the spanwise direction 17. These brackets 64 may thus carry the guide rollers 60, 62 that are inserted into the recesses 58 of the rails 44.

More precisely, this concerns a plurality of main rollers 60, for example two rollers spaced along each rail 44, and of axes of rotation parallel to the spanwise direction 17. These main rollers 60 cooperate with the two opposite branches 56 of the Cs, inasmuch as they can establish internally the contact with them to guide the system 42 and the assembly of the flap 16 in a heightwise direction. Similarly, this also concerns a plurality of lateral rollers 62, for example two rollers spaced along each rail 44, and of axes of rotation orthogonal to the spanwise direction 17. These lateral rollers 62 cooperate with the central cores 54 of the Cs, inasmuch as they can establish externally the contact with them to guide the system 42 and the assembly of the flap 16 in a spanwise direction 17, while remaining housed in the recess 58 like the main rollers 60.

Furthermore, these reinforcing brackets 64 carry the means 40 for actuating the flap 16, these means 40 including a toothed drive wheel 66 engaging with the toothed track 48 of the intermediate reinforcement 46. The toothed wheel 66 itself is rotated by a drive shaft 68 flowing in the spanwise direction 17 in the fixed body 8. This shaft 68 may moreover drive other toothed wheels associated with other rail systems 42.

On either side of the space 50 defined between the two cores 54 of the guide part of the rails 44, and housing the intermediate reinforcement 46, each of the two rails 44 have portions 70 bearing on the other rail, in the stacking direction 17. The four portions 70 that cooperate two-by-two are respectively at the two opposite ends of the guide part of the rails. They therefore close the space 50 in the lengthwise direction of the rails 44 and of the system 42.

In order to ensure their two-by-two assembly, fastening elements 74 of the bolt or rivet type pass through these bearing portions 70, by also preferably being oriented parallel to the spanwise direction 17.

If two of these bearing portions 70 form the two rear ends of the two rails 44, the two other bearing portions 70 for their part are, on the contrary, extended by the front end portions 72 of the two rails 44. These two parallel front end portions 72, representing the segmentation of the two rails 44 along the entire system 42, extend the contact between the same two rails. Although forming part of these rails, they no longer actually serve to guide the flap, because they do not cooperate with the rollers. These front end portions 72 are also assembled with one another by fastening elements 78 of the bolt or rivet type passing through these portions, and also being preferably oriented parallel to the spanwise direction 17.

These fastening elements 78 moreover make it possible to fasten brackets 80 by passing through them, these brackets 80 forming an integral part of the means for mechanically connecting the aerodynamic part 19 of the flap, on the front end portion 72 of the rails 44. Indeed, at an opposite end, the connecting brackets 80 of straight, triangular or other shape are fastened to one or more connecting ribs 82 integrated into the aerodynamic part 19, and protruding rearwards from its closure cover 28, as shown schematically in FIG. 5. In a preferred embodiment, the fastening elements 78 only make it possible to fasten the brackets 80 to the two rails, but without contributing to fastening these two rails together.

FIGS. 11 to 14 show a second preferred embodiment of the invention, having many common points with the first embodiment described above. Moreover, in the figures, elements bearing the same reference numerals correspond to identical or similar elements. The difference resides in the fact that the guide elements 60, 62 still cooperate with the rails 44, but by remaining arranged outside of the recesses 58 defined by the overall C-shape of the rails 44.

Indeed, as regards the main rollers 60, they cooperate externally with the branches 56 of the Cs, by each bearing on the outer surface of two upper branches 56 or of two lower branches 56 of the rails 44. Here also, this concerns a plurality of main rollers 60, that are longer in order to be able to simultaneously contact the two branches 56 with which each of these rollers 60 is associated. For example, one or more main roller 60, known as upper main rollers, contact the upper branches 56 of the rails, and also one or more main rollers 60, known as lower main rollers, contact the lower branches 56 of the rails. In the figures, therefore two upper rollers 60 and two lower rollers 62, again of axes of rotation parallel to the spanwise direction 17, clasp all of the rails 44 in a heightwise direction, or also of the thickness of the wing.

Figure 14:
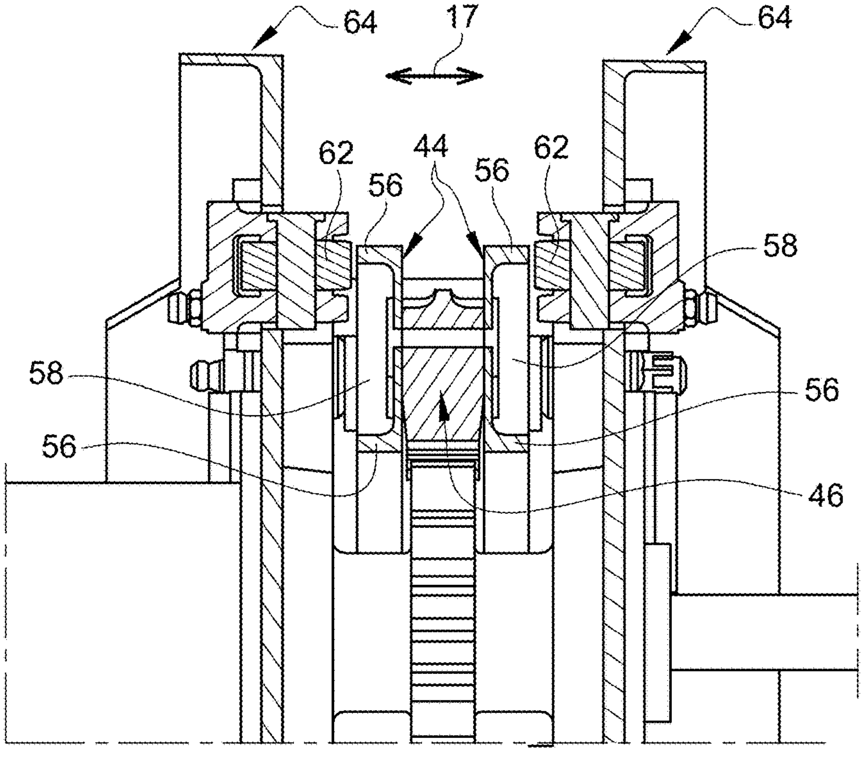
FIG. 14 represents a sectional view similar to that of the preceding one, cut along another sectional plane parallel to the spanwise direction of the flap.

Moreover, it may be provided lateral rollers 62 also cooperating externally with the branches 56 of the Cs, not with their upper and lower outer surfaces, but with the outer lateral edge of these branches, as can best be seen in FIG. 14. These edges correspond to the free lateral ends of the branches 56 of the Cs.

For example, one or more lateral rollers 62, known as upper lateral rollers, contact the edge of the upper branches 56 of the rails, and also one or more lateral rollers 62, known as lower lateral rollers, contact the edge of the lower branches 56 of the rails. In the figures, therefore two upper rollers 62 and two lower rollers 62, again of axes of rotation orthogonal to the spanwise direction 17, clasp all of the rails 44 in a spanwise direction of the wing.

This second preferred embodiment may be preferred for wings having low size constraints, making it possible to locate the rollers 60, 62 outside of the recesses 58 of the Cs. The lateral length of the branches 56 of the rails may advantageously be reduced. In addition, the forces applied by the rollers on the rails are distributed more homogeneously, which favours an easier movement of these rails.

In the case where one or more lateral rollers 62 cooperate externally with the outer lateral edge of the branches 56 of the Cs, the invention provides the possibility of giving an additional security function, which will be described below with reference to FIGS. 15 and 16. This function will be described in combination with a lateral roller 62, but it may be implemented for a plurality of these lateral rollers, or even preferably for all of them.

The lateral roller 62 belongs to a mechanical guide assembly 84 mounted on one of the reinforcing brackets 64 of the fixed central wing body, using for example bolts 86, or similar fastening elements. The mechanical guide assembly 84 includes a support 88 in the form of a clevis, of which a base of this clevis is passed through by fastening bolts 86.

The two clevis branches 90 are passed through orthogonally by the axis of rotation of the lateral roller 62, and they each have, at a free end thereof, a clevis branch extension 92 that extends beyond the lateral roller 62 in the direction opposite to that of the base of the clevis.

The two clevis branch extensions 92 are sufficiently extended to be arranged on either side of the branch 56 of the C against which the lateral roller 62 is bearing, at the edge as described previously. In normal flight conditions, in which none of the main rollers 60 are faulty, a gap is preferably observed between each extension 92 and the surface facing the branch 56 of the C concerned. This makes it possible to limit friction in normal flight conditions, during the deployment/retraction of the movable flap.

Thanks to this particular design, the mechanical guide assembly 84 not only contributes to the lateral guidance of the rails thanks to the bearing of the lateral roller 62 on the outer lateral edge of the branch 56 of the rail, but they may also fulfil an additional security function in the event of failure on one of the main rollers 60. Indeed, when such a failure occurs and the guidance initially given by the main roller 60 is no longer effective, the two clevis branch extensions 92 may take over in guiding the rail in the heightwise direction, at least for a fixed period. This additional "Fail Safe" function is effectively obtained due to the layout of the two extensions 92 on either side of the branch 56 of the C according to the heightwise direction, since during the movement of the flap, these extensions 92 may advantageously in turn enter in contact with the opposite surfaces of the branch 56, after using up the vertical gaps.

Figure 15:
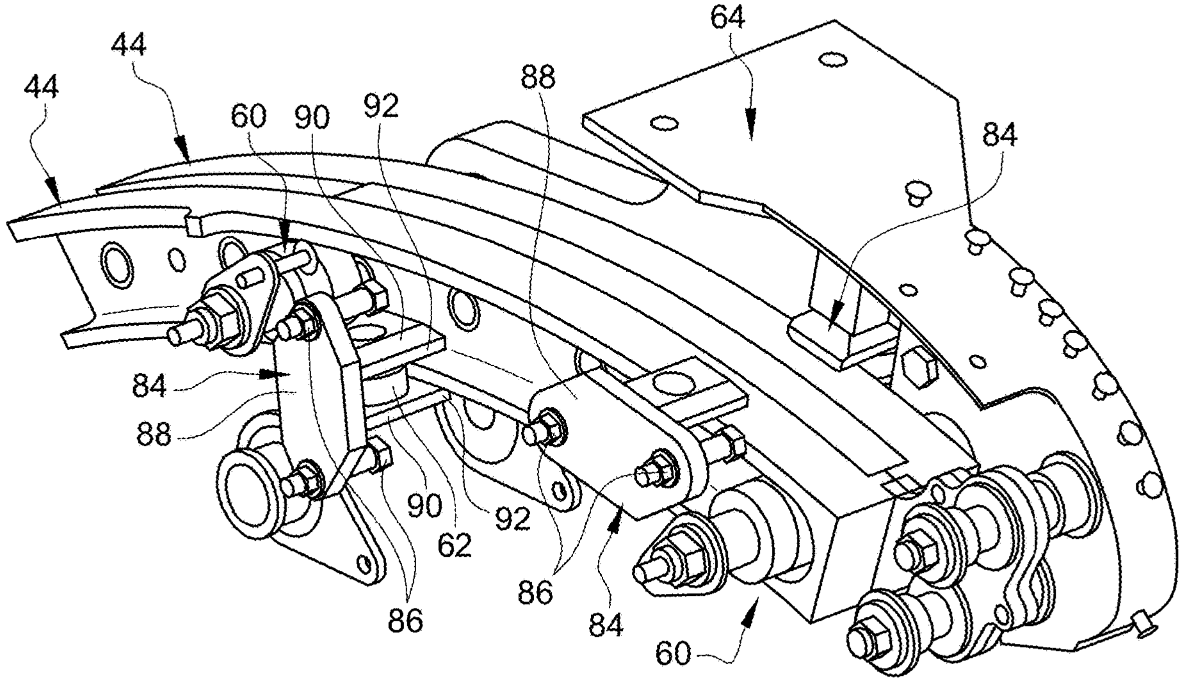
FIG. 15 represents a partial perspective view similar to that of FIGS. 11 and 12, according to an alternative embodiment.
Figure 16:
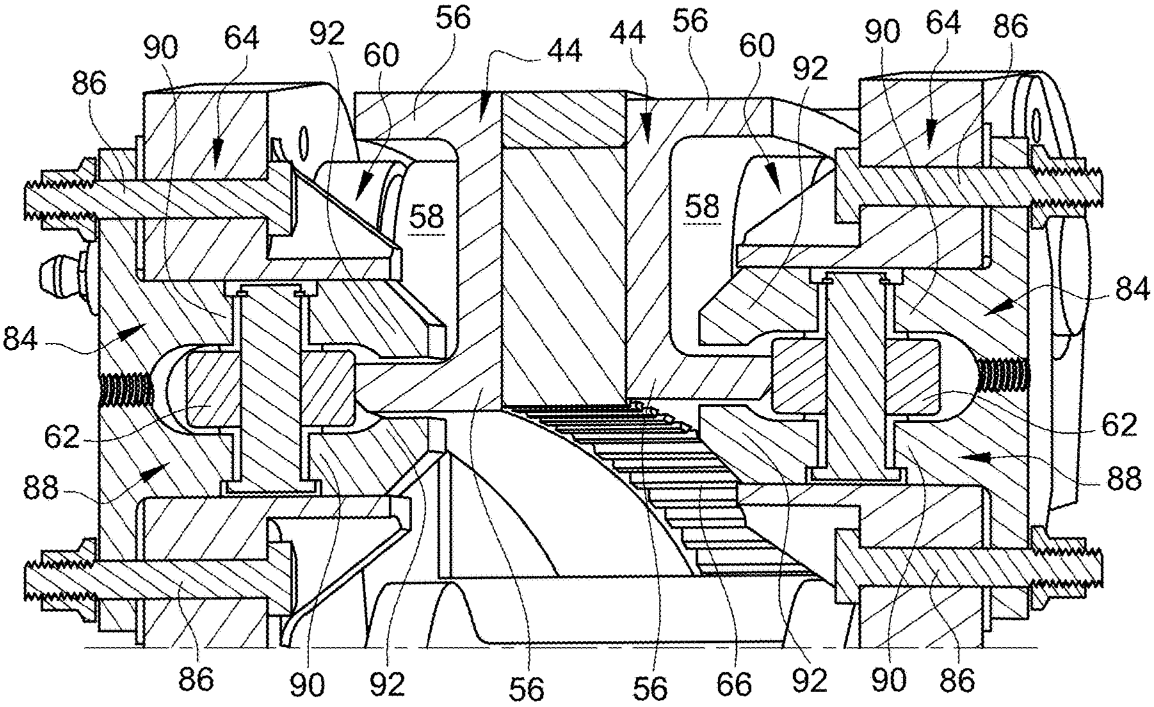
FIG. 16 represents a sectional view similar to that of FIG. 14, cut along a sectional plane of FIG. 16, parallel to the spanwise direction of the flap.

It is noted that this specific feature was presented in a solution shown in FIGS. 15 and 16 where the main rollers 60 are arranged inside the C-shaped rails, as in the first preferred embodiment described previously, but that alternatively, these main rollers 60 may be arranged externally to the rails, as in the second preferred embodiment of the invention.

Of course, various modifications may be made by the person skilled in the art to the invention as described, by way of non-limiting examples only, the scope of which is delimited by the appended claims. In particular, the technical features of the various embodiments described can be combined together and/or interchanged. For example, a hybrid solution could consist in providing that some rollers are housed in the recesses defined by the overall C-shape of the rails, whereas other rollers would cooperate with the rails by being arranged outside of these recesses.

What is claimed is:

1. Movable leading-edge flap for aircraft comprising an aerodynamic part as well as at least one rail system for driving and guiding this movable flap, the flap also comprising means for mechanically connecting the aerodynamic part on a front end portion of the drive and guide rail system, wherein the drive and guide rail system includes two rails each extending over the entire length of the rail system, an intermediate reinforcement provided with a toothed drive track-being housed between the two rails in a stacking direction according to which these three separate elements are pressed against one another, the stacking direction corresponding to the spanwise direction of the movable flap, wherein rail-fastening elements allow each rail to be fastened to the intermediate reinforcement, wherein said means for mechanically connecting the aerodynamic part are fastened on a front end portion of each of the two rails, and wherein each of the two rails has an overall C-shaped cross-section, with the two Cs arranged back-to-back and their recesses open in the spanwise direction, wherein on each side of a space defined between the two rails for housing the intermediate reinforcement, a respective one of the two rails has bearing portions for bearing on the other of the two rails, in the stacking direction, so as to have four bearing portions which cooperate two-by-two and are respectively at two opposite ends of a guide part of each of the rails, wherein the bearing portions close, in a lengthwise direction of the two rails, the space housing the intermediate reinforcement, wherein two of the bearing portions form the two respective rear ends of the rails, and the other two of the bearing portions are respectively extended by the two front end portions of the two rails, and wherein the bearing portions are passed through by fastening elements that do not pass through the intermediate reinforcement.

2. Movable flap according to claim 1, wherein each of the two rails is made in one piece.

3. Movable flap according to claim 1, wherein the mechanical connection means comprise brackets fastened on the two rails.

4. Movable flap according to claim 1, wherein the rail fastening elements comprise bolts distributed along the drive and guide rail system.

5. Aircraft wing comprising a fixed central wing body, as well as at least one movable leading-edge flap according to claim 1, the flap being intended to be moved relative to said fixed central body between a deployed position and a retracted position, the fixed central wing body being provided with means for actuating the toothed drive track of the movable flap.

6. Wing according to claim 5, further comprising reinforcing brackets arranged in a leading-edge portion of the fixed central body of the wing, and in that the actuation means are mounted on these reinforcing brackets.

7. Wing according to claim 5 wherein the fixed central body is provided with elements for guiding the movable flap, cooperating with the rails.

8. Wing according to claim 7, wherein at least some of the guide elements of the movable flap are housed in the recesses defined by the overall C-shape of the rails.

9. Wing according to claim 8, wherein the guide elements comprise main rollers cooperating internally with the two opposite branches of the Cs.

10. Movable leading-edge flap of claim 9, wherein the guide elements comprise lateral rollers cooperating with the central core of these same Cs.

11. Wing according to claim 7, wherein at least some of the guide elements of the movable flap cooperate with the rails, by being arranged outside of the recesses defined by the overall C-shape of the rails.

12. Wing according to claim 11, wherein the guide elements comprise main rollers cooperating externally with the branches of the Cs.

13. Movable leading-edge flap of claim 12, wherein the guide elements comprise lateral rollers also cooperating externally with the branches of the Cs.

14. Wing according to claim 9, wherein at least one guide element in the form of a lateral roller for guiding the movable flap, cooperating with an outer lateral edge of one of the branches of the Cs, is carried by a support in the form of a clevis comprising two clevis branches-each having, at one free end thereof, a clevis branch extension that extends beyond the lateral roller in a direction opposite to that of a base of the clevis, the two clevis branch extensions being arranged on either side of the branch of the C with which the lateral roller cooperates.

15. Aircraft comprising at least one wing according to claim 5.

16. Aircraft of claim 15, wherein the at least one wing is provided with a plurality of movable leading-edge flaps.

17. Movable leading-edge flap of claim 5, wherein the actuation means comprise a toothed drive wheel engaging with the toothed drive track of the movable flap.

18. Movable leading-edge flap of claim 1, wherein the rail-fastening elements pass through each of the two rails as well as the intermediate reinforcement.

* * * * *